(12) United States Patent
Choi

(10) Patent No.: US 12,263,613 B2
(45) Date of Patent: Apr. 1, 2025

(54) PRESS APPARATUS FOR VEHICLE CRASH PADS COMPRISING REAL WOOD SHEETS AND METHOD OF MANUFACTURING VEHICLE CRASH PADS USING THE SAME

(71) Applicant: HYUNDAI MOBIS Co., Ltd., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 491 days.

(21) Appl. No.: 17/841,071

(22) Filed: Jun. 15, 2022

(65) Prior Publication Data
US 2023/0038199 A1 Feb. 9, 2023

(30) Foreign Application Priority Data
Aug. 4, 2021 (KR) .................. 10-2021-0102379

(51) Int. Cl.
*B27D 3/00* (2006.01)
*B60R 21/055* (2006.01)

(52) U.S. Cl.
CPC .............. *B27D 3/00* (2013.01); *B60R 21/055* (2013.01)

(58) Field of Classification Search
CPC ............ B27D 3/00; B29C 43/36; B29C 43/04
See application file for complete search history.

(56) References Cited

FOREIGN PATENT DOCUMENTS

KR 10-2020-0042116 A 4/2020

*Primary Examiner* — Daniel McNally
(74) *Attorney, Agent, or Firm* — NSIP Law

(57) ABSTRACT

A press apparatus for vehicle crash pads comprising real wood sheets includes an upper press having a preforming cavity on one side thereof and a bonding cavity on another side thereof, a lower press to perform a preforming process through compression to the preforming cavity, and to perform compression to the bonding cavity by rotating during a compression process; and a lower press mover to rotate the lower press.

10 Claims, 14 Drawing Sheets

PRESS APPARATUS FOR VEHICLE CRASH PADS COMPRISING REAL WOOD SHEETS AND METHOD OF MANUFACTURING VEHICLE CRASH PADS USING THE SAME

CROSS-REFERENCE TO RELATED APPLICATIONS

This application claims the benefit under 35 USC § 119(a) of Korean Patent Application No. 10-2021-0102379, filed on Aug. 4, 2021 in the Korean Intellectual Property Office, the entire disclosure of which is incorporated herein by reference for all purposes.

BACKGROUND

1. Technical Field

The present disclosure relates to a real wood skin capable of automatic wrapping, and a process and apparatus for manufacturing the same.

2. Related Art

A conventional real wood skin used for vehicles is produced by preforming a real wood sheet on decorative veneer wood, performing insert injection (rear injection) molding on the preformed real wood sheet, trimming the end of the injected real wood sheet, and then curling and coating the trimmed real wood sheet in this order.

Such a conventional real wood skin product may provide a real wood surface with excellent visual and tactile sense due to rear injection molding applied thereto, but feels cheep when pressed by consumers since it comprises high-hardness real wood attached on the injected surface thereof.

Of course, some customers may assume that the skin product is hard due to high-hardness real wood. However, this product may not satisfy customers who want the interior material thereof to be soft.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are provided to use a side slide core for implementation of undercuts, to improve adhesion between a real wood sheet and a core, and to use a rear slide core for implementation of automatic wrapping of the real wood sheet and thus process automation.

Various embodiments are also directed to a press apparatus for vehicle crash pads comprising real wood sheets that can provide elasticity while giving a visual impression like real wood.

Moreover, various embodiments are directed to a press apparatus for vehicle crash pads comprising real wood sheets that simultaneously perform wood preforming and core bonding in a press manner without a separate wood preforming process.

The present disclosure is not limited to the above-mentioned objects, and other objects of the present disclosure can be clearly understood by those skilled in the art to which the present disclosure pertains from the following description.

In one general aspect, a press apparatus for vehicle crash pads including real wood sheets includes an upper press having a preforming cavity on one side thereof and a bonding cavity on another side thereof, a lower press configured to perform a preforming process through compression to the preforming cavity, and to perform compression to the bonding cavity by rotating during a compression process; and a lower press mover configured to rotate the lower press.

The lower press may include a skin holding pin for fixing a real wood skin, the skin holding pin being inserted into a first fixing hole disposed in a wrapping fixing rib of the real wood skin.

The skin holding pin may protrude out of the lower press or may be inserted into the lower press. The lower press may include a compression fixing pin, the compression fixing pin protruding when the skin holding pin is inserted into the lower press, to form the first fixing hole for fixing in a compression fixing rib of a real wood sheet during compression fixing.

The preforming cavity of the upper press may include a holding pin protrusion for pressing the skin holding pin during the preforming process.

The lower press mover may be configured to slide the lower press from the preforming cavity to the bonding cavity.

In another general aspect, a method of pressing vehicle crash pads including real wood sheets includes locating a lower press in a preforming cavity disposed on one side of an upper press having a bonding cavity on another side thereof, seating a real wood sheet on the lower press, and performing a preforming process of the real wood sheet by compressing the lower press to the preforming cavity of the upper press, temporarily bonding a core to the bonding cavity of the upper press, allowing a lower press mover to rotate the lower press provided with the real wood sheet to locate the lower press in the bonding cavity of the upper press, and compressing the bonding cavity of the upper press to the lower press.

In seating the real wood sheet one the lower press, the lower press may include a skin holding pin, and the skin holding pin may be fixedly inserted into a first fixing hole disposed in a wrapping fixing rib of a real wood skin.

The performing he preforming process of the real wood sheet may include inserting the skin holding pin, which protrudes out of the lower press, into the real wood sheet, and forming the first fixing hole for fixing in a compression fixing rib of the real wood sheet during compression fixing by allowing a compression fixing pin disposed inside the lower press to protrude therefrom.

In the performing the preforming process of the real wood sheet, during the preforming process, the skin holing pin may be pressed by a holding pin protrusion for inserting the skin holding pin, which protrudes out of the lower press, into the real wood sheet.

In the allowing the lower press mover to rotate the lower press provided with the real wood sheet to locate the lower press in the bonding cavity of the upper press, the lower press may slide from the preforming cavity to the bonding cavity.

Other features and aspects will be apparent from the following detailed description, the drawings, and the claims.

DETAILED DESCRIPTION

Advantages and features of the present disclosure and methods of achieving them will become apparent with reference to the embodiments described below in detail in conjunction with the accompanying drawings. The present disclosure may, however, be embodied in different forms, and should not be construed as being limited to the embodiments set forth herein. Rather, these embodiments are provided so that the disclosure will be thorough and complete, and will fully convey the scope of the present disclosure to those skilled in the art. The present disclosure should be defined based on the entire content set forth in the appended claims. Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/"including" when used in the specification, specify the presence of stated components, steps, motions, and/or elements, but do not preclude the presence or addition of one or more other components, steps, motions, and/or elements.

Figure 1:
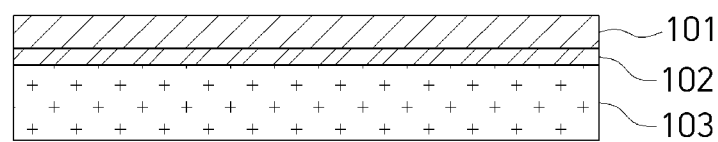
FIG. 1 is a reference view for explaining a real wood skin capable of automatic wrapping according to the present disclosure.

FIG. 1 is a reference view for explaining a real wood skin capable of automatic wrapping according to a first embodiment of the present disclosure.

As illustrated in FIG. 1, the real wood skin capable of automatic wrapping according to the first embodiment of the present disclosure includes a wood layer 101, a mesh layer 102, and an elastic layer 103.

The wood layer 101 is a layer that gives the same visual impression as wood material. The wood layer 101 preferably has a thickness of 0.1 to 0.2 t, and may have wood grain formed by a shading machine.

The mesh layer 102 is a layer that is laminated under the wood layer 101 to reinforce the sheet. It is preferable that the mesh layer 102 have a thickness of 0.2 t.

The elastic layer 103 is a layer that is laminated under the mesh layer 102 to provide elasticity. The elastic layer 103 may be formed of polypropylene (PP) foam or thermoplastic polyolefin (TPO) foam. It is preferable that the elastic layer 103 have a thickness of 1 t to 2 t.

According to the first embodiment of the present disclosure, the real wood skin may further include a protective film 104 laminated on the wood layer 101 to protect the wood layer. It is preferable that the protective film 104 have a thickness of 0.1 t.

FIGS. 2A to 2E are reference views for explaining a process of manufacturing a real wood sheet according to an embodiment of the present disclosure.

Figure 2A:
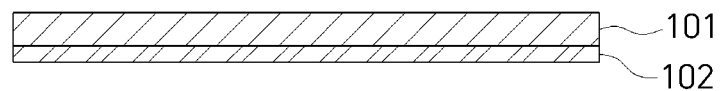
FIGS. 2A, 2B, 2C, 2D and 2E are reference views for explaining a process of manufacturing vehicle crash pads comprising real wood sheets according to the first embodiment of the present disclosure.
Figure 2B:
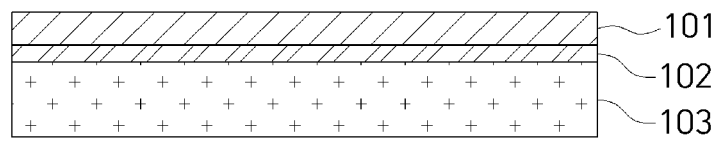
Figure 2C:
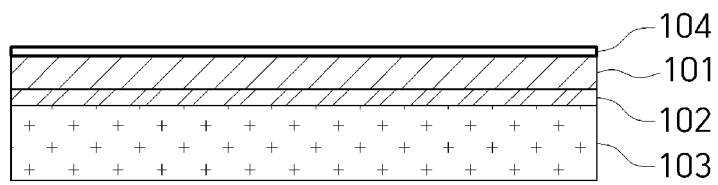

In the real wood sheet of the first embodiment of the present disclosure, the mash layer 102 is laminated under the wood layer 101 as illustrated in FIG. 2A, and the elastic layer 103 is then laminated under the mash layer 102 as illustrated in FIG. 2B. As illustrated in FIG. 2C, the protective film 104 may be laminated on the wood layer 101 to protect the wood layer 101.

Figure 2D:
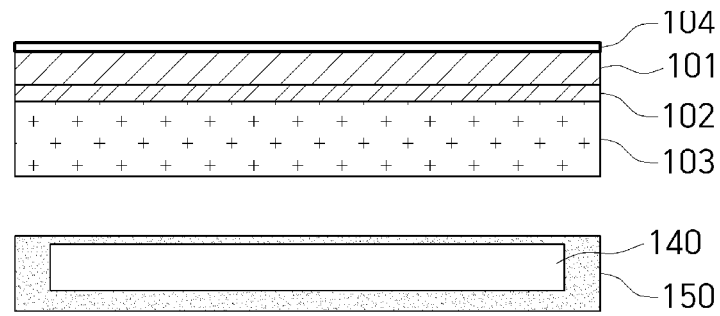
Figure 2E:
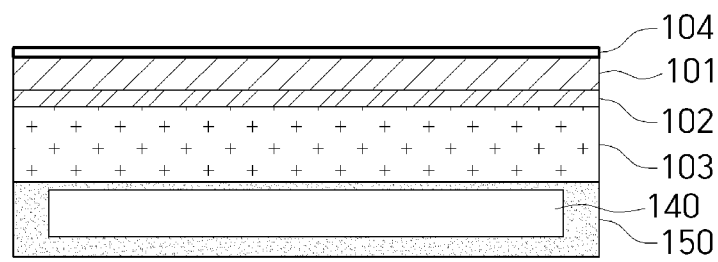

As illustrated in FIGS. 2D and 2E, the real wood sheet 100 further includes a filament cross pad 140 and a core 150 provided at the bottom thereof. The filament cross pad 140 is provided in a partial area of a vehicle desk to allow that area to be cushioned.

As such, it is preferable that the filament cross pad 140 provided in one area of the desk be laminated under the elastic layer 103. It is preferable that the filament cross pad 140 have a thickness of 2 to 5 t, and be applied to an entire area of 3 mm or less from the injected end of the real wood sheet, which is touched by a hand. The filament cross pad 140 may be made of, but not limited to, PP or TPO material.

The core 150 is mounted on the vehicle desk, and preferably has a thickness of 0.3 t.

After performing a bonding operation of applying a glue following a primer to the core 150, the filament cross pad 140 is attached on the core 150. In this case, this may be made using a membrane or by press compression. After an additional bonding operation of applying a glue to the top of the filament cross pad 140 is performed, the wood layer 101, the mesh layer 102, the elastic layer 103, the filament cross pad 140, and the protective film are compressed with a compression jig.

As such, according to the first embodiment of the present disclosure, it is possible to make the real wood sheet 100, constituting the vehicle desk, feel the same as real wood, and to provide a certain degree of cushioning when the real wood sheet is touched by an occupant.

In the conventional case of manufacturing a real wood sheet through injection molding, it is impossible to implement the effect of the present disclosure. However, according to the first embodiment of the present disclosure, it is possible to supplement the elongation of the real wood sheet and improve the surface quality of the real wood sheet by applying PP foam/TPO foam to the rear surface of the wood, and to make a real wood wrapping product to be soft by applying the filament cross pad used for existing natural or artificial leather to the core.

The real wood sheet 100 includes a real wood sheet body 110 formed to have the same shape as the real wood product. The real wood sheet 100 includes a plurality of wood sheet compression fixing ribs 120 and wrapping fixing ribs 130 formed on the outside of the real wood sheet body 110 in order to fix the real wood sheet 100. The wood sheet compression fixing ribs 120 use a molding (cutting) machine to form a real wood sheet fabric.

Each of the compression fixing ribs 120 has a first fixing hole 121 for fixing the real wood sheet to a press during a preforming process. The first fixing hole 121 is fixed to the fixing pin of the press during the preforming process. The first fixing hole 121 may be further provided with a slit groove 122.

Accordingly, during the preforming, the fixing pin of the preforming press may move along the slit groove 122 in the first fixing hole 121, thereby preventing damage to the real wood body.

As such, when the preforming process is performed on the real wood sheet 100 in a state in which the first fixing hole 121 formed in the compression fixing rib 120 of the real wood sheet 100 is fixed to the fixing pin of the preforming press, the first fixing hole 121 may be opened, thereby preventing damage due to the fixing of the real wood sheet body 110 during the preforming.

Next, during a wood press process, each of the wrapping fixing ribs 130 has a second fixing hole 131 formed by means of the hole processing pin of the preforming press during the preforming in order to fix the real wood sheet to the pin of the press molding machine.

According to the first embodiment of the present disclosure, the real wood sheet 100 includes the real wood sheet body 110 formed to have the same shape as the real wood product by molding (cutting) the real wood sheet 100 fabric, the plurality of wood sheet compression fixing ribs 120 each formed to have a predetermined length by molding (cutting) the real wood sheet 100 fabric on the outside of the real wood sheet body 110 to fix the real wood sheet 100 during the preforming process, and the plurality of wrapping fixing ribs 130 each formed to have a predetermined length by molding (cutting) the real wood sheet 100 fabric on the outside of the real wood sheet body 110 to fix the real wood sheet 100 during the compression process.

Each of the compression fixing ribs 120 has the first fixing hole 121 formed at the specific position thereof by the elongation of the real wood.

Each of the wrapping fixing ribs 130 has the second fixing hole 131 formed by the pin of the press molding machine during the preforming process for inserting the fixing pin of the press molding machine thereinto.

According to the first embodiment of the present disclosure, it is possible to configure a wrapping sheet layer capable of performing the preforming process by fixing the real wood sheet to the preforming press using the compression fixing ribs 120 during the preforming process, and of performing the compression press process by forming the second fixing hole in each wrapping fixing rib required for the next compression process during the preforming process and then fixing the real wood sheet to the compression press which will be performed.

Figure 3:
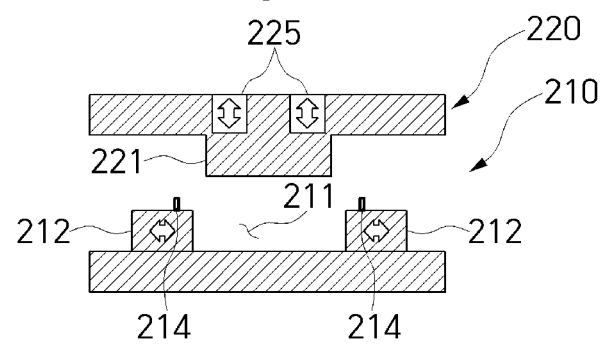
FIGS. 3, 4, 5, 6 and 7 are reference views for explaining a compression process in a press apparatus for vehicle crash pads comprising real wood sheets according to first embodiment of the present disclosure.

FIG. 3 is a process flow diagram for explaining a press apparatus for vehicle crash pads comprising real wood sheets according to the first embodiment of the present disclosure.

The press apparatus for vehicle crash pads comprising real wood sheets according to first embodiment of the present disclosure includes a lower press 210, an upper press 220, and a movable core 230.

The lower press 210 includes an engraved part 211 provided in an area where a real wood product is to be retained and formed, and support parts 212 configured to support the upper press 220 when compressed to the upper press 220. Each of the support parts 212 has a fixing pin 213 for fixing a real wood sheet 100. The fixing pin 213 may be inserted into a second fixing hole 131 formed in each compression fixing rib 120 provided in the real wood sheet 100 during a preforming process, thereby fixing the real wood sheet 100.

The upper press 220 includes an embossed part 221 corresponding to the engraved part 211 of the lower press 210.

The movable core 230 is provided in the engraved part 211 of the lower press 210 to guide the real wood sheet 100 while moving up and down from the engraved part 211 when the upper press 220 moves downward.

It is preferable that the fixing pin 213 be provided at a position obtained by calculating the elongation of the sheet at the edge of the real wood sheet 100 when the real wood sheet 100 is compressed.

The lower press 210 may further include a hole processing pin 214, which protrudes when the embossed part 221 of the upper press 220 is compressed to the engraved part 211 of the lower press 210 and forms a fixing hole in each wrapping fixing rib 130.

When the fixing pin 213 provided in the lower press 210 is pressed by the upper press 220, the hole processing pin 214 may protrude and form the second fixing hole 131 in the wrapping fixing rib 130 of the real wood sheet 100.

Although the first embodiment of the present disclosure illustrates that the engraved part is formed in the lower press 210, the present disclosure is not limited thereto. The shapes of the lower and upper presses 210 and 220 may be interchanged within a corresponding range.

In the first embodiment of the present disclosure, as illustrated in FIG. 3, the press apparatus includes the lower press 210 and the upper press 220.

Figure 4:
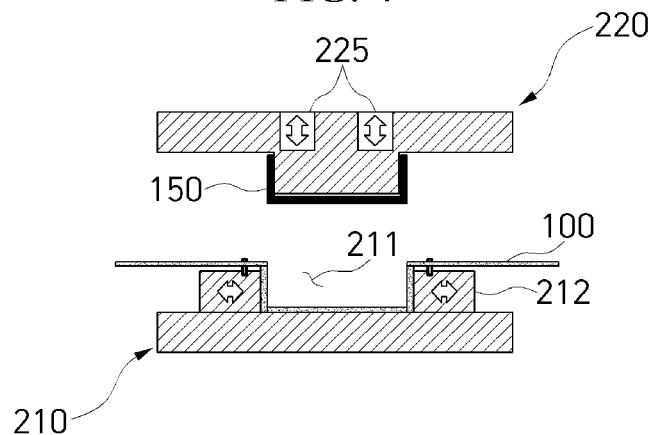

As illustrated in FIG. 4, the real wood sheet 100 is seated on the first fixing hole 213 of the lower press 210.

Figure 5:
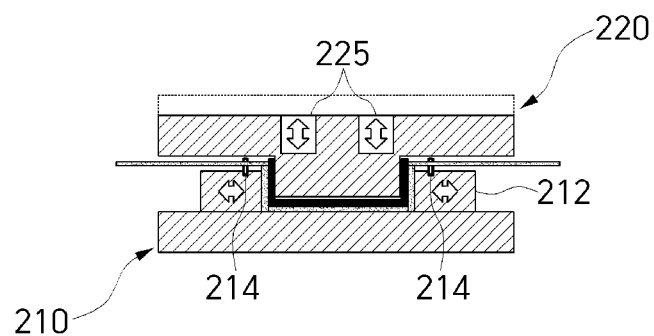

In this state, the upper press 100 is moved downward. In this case, as illustrated in FIG. 5, the movable core 230 provided in the lower press 210 guides the real wood sheet 100 by rising when the upper press 100 moves downward.

Figure 6:
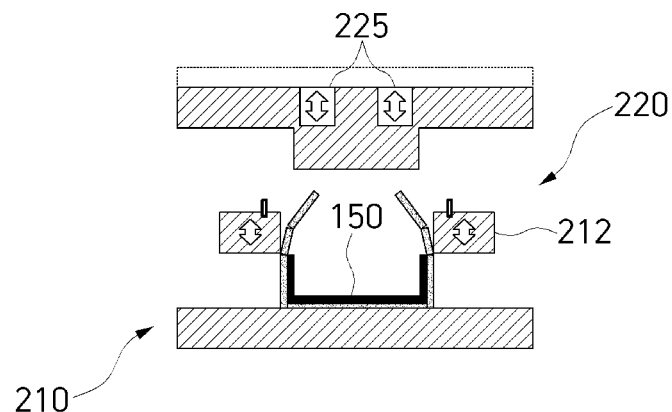

Next, as illustrated in FIG. 6, the upper press 220 is compressed to the lower press 210 so that the preforming process of the real wood sheet 100 is completed.

Figure 7:
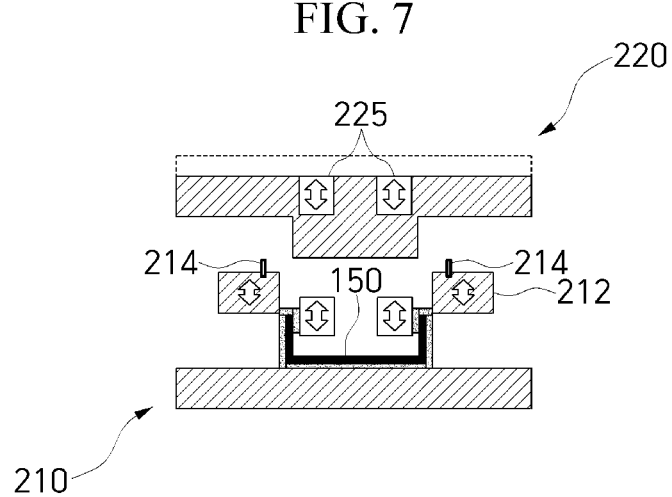

Meanwhile, as illustrated in FIG. 7, the second fixing hole 131 is formed in the wrapped fixing rib 130 of the real wood sheet 100 through the hole processing pins 214 provided in the lower press 210 in the process of compressing the lower press 210 to the upper press 220.

As such, according to the first embodiment of the present disclosure, by automatically forming the fixing hole required for the processing of the real wood sheet during the preforming process, it is possible to prevent the position of the fixing hole from being changed by the preforming process and to shorten the additional overall process.

That is, when the fixing hole required for the compression process is formed during the initial preforming process, it is possible to prevent the position of the fixing hole from being changed while the real wood sheet is compressed by the press apparatus in the preforming process.

The press apparatus for vehicle crash pads comprising real wood sheets according to the first embodiment of the present disclosure will be described with reference to FIG. 3.

FIG. 3 is a view for explaining the press apparatus for vehicle crash pads comprising real wood sheets according to the first embodiment of the present disclosure.

As illustrated in FIG. 3, the press apparatus for vehicle crash pads comprising real wood sheets according to first embodiment of the present disclosure includes a lower press 210, an upper press 220, a plurality of first slides 212, and a plurality of a second slides 225.

The lower press 210 includes an engraved part 211 provided in an area where a product is to be formed, and support parts 212 configured to support the upper press 220 when compressed to the upper press 220. Each of the support parts 212 has a fixing pin 213 for fixing a real wood sheet 100.

The upper press 220 includes an embossed part 221 corresponding to the engraved part 211 of the lower press 210.

The first slides 212 are moved and fixed to maintain the shape of the engraved part 211 of the lower press 210 during the compression process of the real wood sheet 100, thereby forming the engraved part 211. After the compression process of the real wood sheet 100, the first slides 212 compress the rear surface of the real wood sheet 100 while rising along the embossed part 221 of the upper press 220, and then move laterally.

The second slides 225 are provided in the upper press 220 so that, during the compression process of the real wood sheet 100, they compress the real wood sheet 100 located on the engraved part 211 together with the embossed part 221 of the upper press 220.

After the second slides 225 rise together with the upper press 220 during the wrapping process of the real wood sheet 100, the rear surface of the real wood sheet 100 is compressed by the first slides 212.

Next, the second slides 225 compress the real wood sheet 100 to an inner rear surface of a core 150 while falling such that the real wood sheet 100 bent inward of the engraved part 211 may be wound around the core 150.

As such, according to the first embodiment of the present disclosure, it is possible to automatically produce a real wood product in which the real wood sheet is wrapped around the core after performing the process of compressing the preformed real wood sheet to the core.

A process of the press apparatus for vehicle crash pads comprising real wood sheets according to the first embodiment of the present disclosure will be described with reference to FIGS. 4 to 7.

First, as illustrated in FIG. 4, the preformed real wood sheet 100 is seated on the lower press 210, and the core 150 is temporarily bonded to the upper press 220.

Next, as illustrated in FIG. 5, the upper press 220 is compressed to the lower press 210.

Next, as illustrated in FIG. 6, the upper press 220 is moved up, and the first slides 212 rise along the rear surface of the real wood sheet 100 and move along the side of the real wood sheet.

Next, as illustrated in FIG. 7, by lowering the second slides 225 provided in the upper press 220 to compress the real wood sheet 100 located inside the engraved part 211 of the lower press 210, it is possible to automatically perform the wrapping process of the real wood sheet using the slides. That is, the second slides 225 may compress the real wood sheet 100 to an inner rear surface of a core 150 while falling such that the real wood sheet 100 bent inward of the engraved part 211 may be wound around the core 150.

A press apparatus for vehicle crash pads comprising real wood sheets according to the first embodiment of the present disclosure will be described with reference to FIGS. 8 to 11.

The press apparatus for vehicle crash pads comprising real wood sheets according to the first embodiment of the present disclosure includes a lower press, an upper press, a plurality of first slides, and a plurality of third slides.

The lower press includes an engraved part in an area where a product is to be formed, and support parts configured to support the upper press when compressed to the upper press, and each of the support part has a fixing protrusion for fixing a real wood sheet.

The upper press includes an embossed part corresponding to the engraved part of the lower press.

The first slides are fixed to maintain the shape of the engraved part of the lower press during the compression process of the real wood sheet. After the compression process of the real wood sheet, the first slides compress the rear surface of the real wood sheet while rising along the embossed part of the upper press and then move laterally.

The third slides are fixed to maintain the shape of the engraved part of the lower press during the compression process of the real wood sheet. After the compression process of the real wood sheet, the third slides compress the rear surface of the real wood sheet while rising along the embossed part of the upper press, and then move to the side of the real wood sheet to cut a portion of the real wood sheet deviating from the core.

Figure 8:
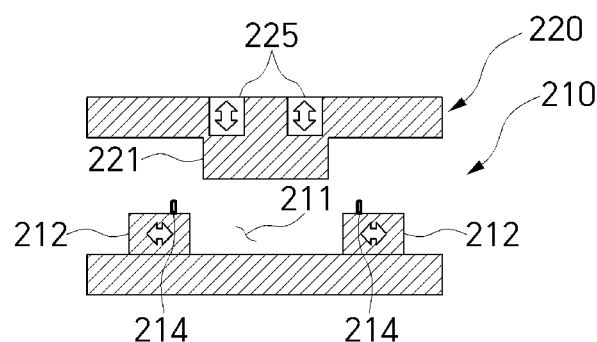
FIGS. 8, 9, 10, 11 and 12 are views for explaining a process of cutting a real wood sheet in a press apparatus for vehicle crash pads comprising real wood sheets according to the first embodiment of the present disclosure.
Figure 9:
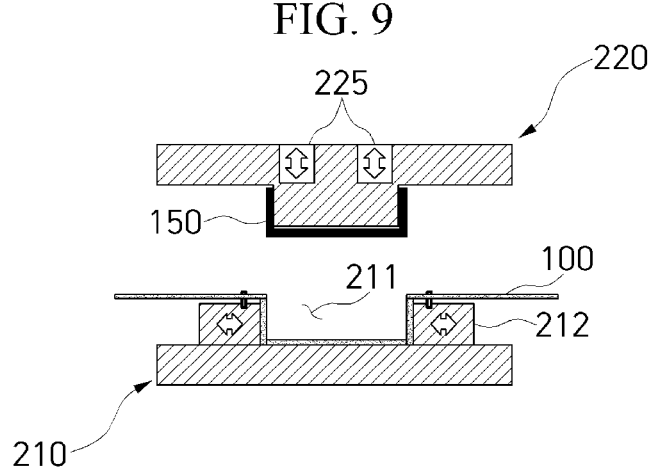

First, as illustrated in FIG. 8, the preformed real wood sheet 100 is seated on the lower press 210, and the core 150 is temporarily bonded to the upper press 220 as illustrated in FIG. 9.

Figure 10:
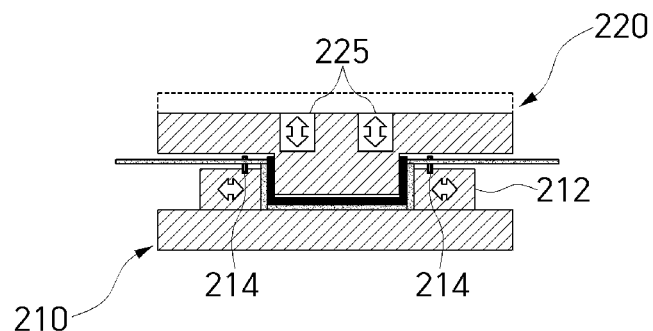

Next, as illustrated in FIG. 10, the upper press 220 is compressed to the lower press 210.

Figure 11:
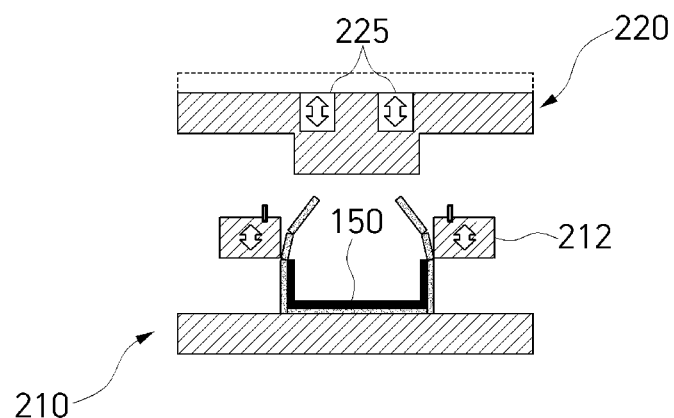
Figure 12:
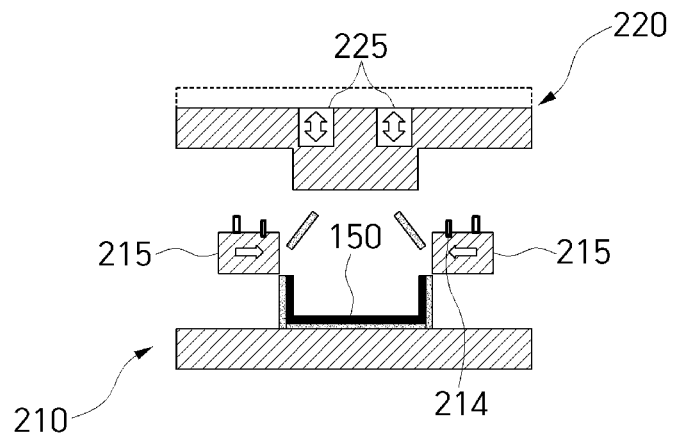

Next, as illustrated in FIG. 11, the upper press 220 is moved up, and the first slides 212 rise along the rear surface of the real wood sheet 100 to press the real wood sheet against the core 150 as illustrated in FIG. 12.

Figure 13:
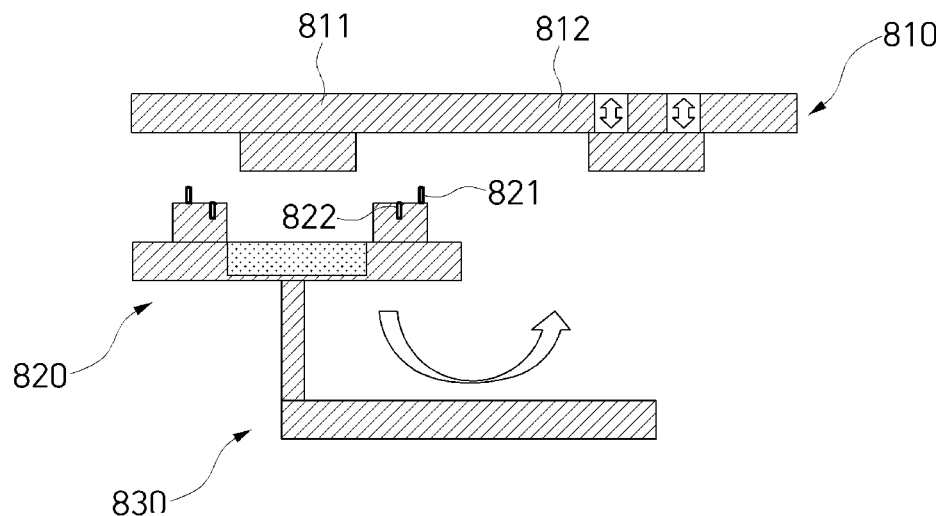
FIG. 13 is a view for explaining a press apparatus for vehicle crash pads comprising real wood sheets according to a second embodiment of the present disclosure.

As illustrated in FIG. 13, after the real wood sheet 100 is pressed against the core 150, the third slides 215 cut a portion of the real wood sheet 100 deviating from the core 150 while moving inward.

As such, in a second embodiment of the present disclosure, it is possible to automatically undercut a portion of the compressed real wood sheet deviating from the core.

FIG. 13 is a view for explaining a press apparatus for vehicle crash pads comprising real wood sheets according to the second embodiment of the present disclosure.

Figure 14:
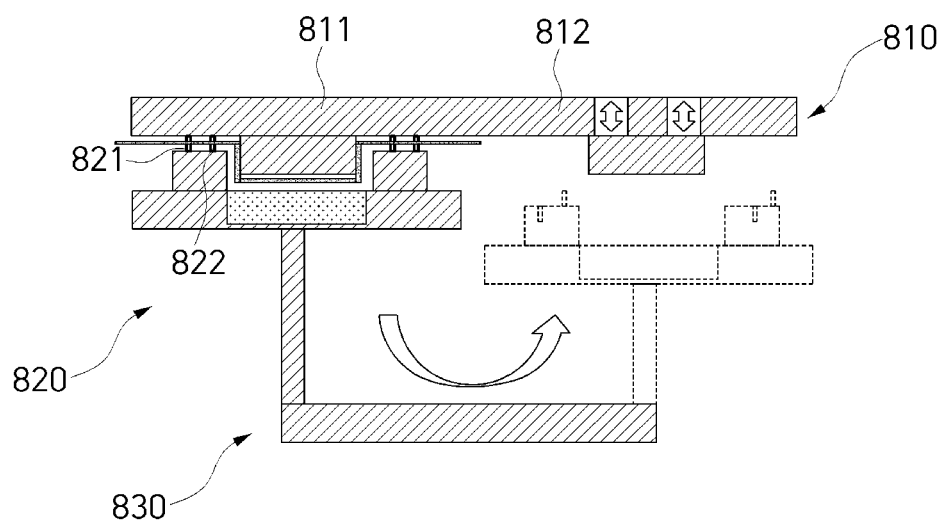
FIGS. 14 and 15 are reference views for explaining the operation process in FIG. 13.

As illustrated in FIG. 14, the press apparatus for vehicle crash pads comprising real wood sheets according to the second embodiment of the present disclosure includes an integrated upper press 810 having a preforming cavity 811 and a bonding cavity 812 provided integrally therein, a lower press 820, and a lower press mover 830.

The integrated upper press 810 has the preforming cavity 811 on one side thereof and the bonding cavity 812 on the other side thereof.

The lower press 820 performs a preforming process of a real wood sheet 100 through compression to the preforming cavity 811 during preforming, and performs a compression process between the real wood sheet 100 and a core 150 through compression to the bonding cavity 812 by rotating or moving during compression.

The lower press mover 830 rotates or moves the lower press 820 according to that process.

The lower press 820 further includes a skin holding pin 821 inserted into a first fixing hole 121 provided in each wrapping fixing rib 130 of the real wood skin for fixing the real wood skin.

The skin holding pin 821 protrudes out of or inserted into the lower press 820. The lower press 820 further includes a compression fixing pin 822 provided therein. The compression fixing pin 822 protrudes when the skin holding pin 821 is inserted into the lower press 820, to form the first fixing hole 121 for fixing the real wood sheet 100 in each compression fixing rib 120 of the real wood sheet 100 during compression fixing.

The lower press mover 830 may slide the lower press 820 from the preforming cavity 810 to the bonding cavity 820.

Figure 15:
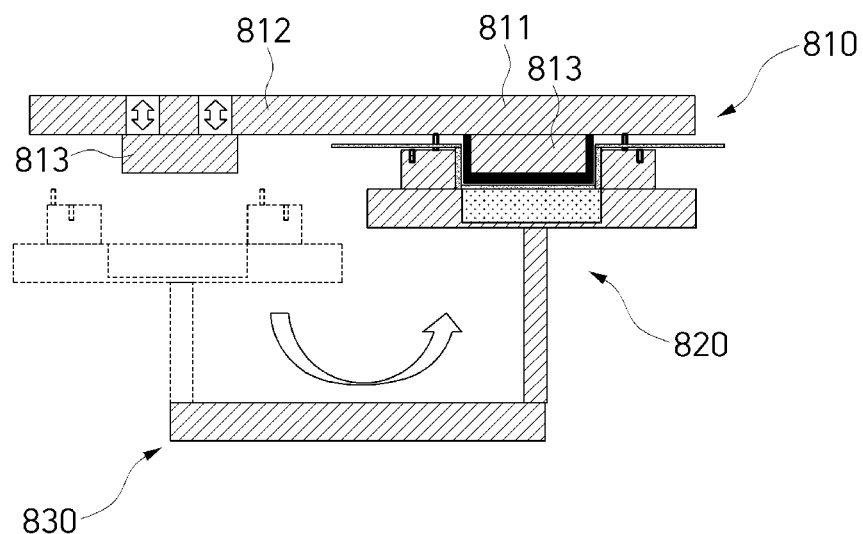

According to the second embodiment of the present disclosure, as illustrated in FIG. 13, after the preforming cavity 811 and the core 150 are preformed in the mold, a hole for bonding with the core 150 is processed, and as illustrated in FIG. 15, the lower press 210 and the core 150 are rotated and moved to the position of the bonding cavity 812. Accordingly, it is possible to shorten the process time of bonding the preformed wood and the core 150.

According to the second embodiment of the present disclosure, reducing the process time and the process steps can result in quality improvements and reduce investment/cost and cycle time.

A press apparatus for vehicle crash pads comprising real wood sheets according to a third embodiment of the present disclosure will be described with reference to FIGS. 16 to 24.

Figure 16:
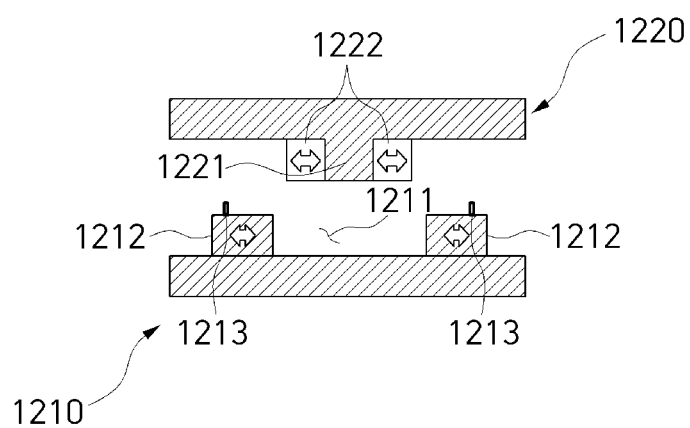
FIGS. 16, 17, 18, 19, 20, 21, 22, 23 and 24 are reference views for explaining a preforming process in a press apparatus for vehicle crash pads comprising real wood sheets according to a third embodiment of the present disclosure.

FIG. 16 is a view for explaining the press apparatus for vehicle crash pads comprising real wood sheets according to the third embodiment of the present disclosure.

As illustrated in FIG. 16, the press apparatus for vehicle crash pads comprising real wood sheets according to the third embodiment of the present disclosure includes a lower press 1210 and an upper press 1220.

The lower press 1210 includes an engraved part 1211 provided in an area where a product is to be formed, and support parts 1212 configured to support the upper press 1220 when compressed to the upper press 1220. Each of the support parts 1212 has a fixing pin 1213 for fixing a real wood sheet 100.

The upper press 1220 includes an embossed part 1221 corresponding to the engraved part 1211 of the lower press 1210, and first slides 1222 moving in the embossed part 1221 to adjust the width of the embossed part 1221.

The lower press 1210 further includes second slides configured to compress the rear surface of the real wood sheet 100 while rising along a core 150 bonded to the upper press 1220 during the compression process of the real wood sheet 100.

After the compression process of the real wood sheet, the first slides 1222 rise together with the upper press 1220.

Next, during the wrapping process of the real wood sheet, the first slides 1222 compress the inner rear surface of the core 150 while moving downward of the embossed part 1221 of the upper press 1220 such that, after the rear surface of the real wood sheet 100 is compressed by the second slides 1212, the real wood sheet 100 bent inward of the engraved part 1211 may be wound around the core 150.

The lower press 1210 includes the engraved part 1211 provided in the area where the product is to be formed, and the support parts 1212 configured to support the upper press 1220 when compressed to the upper press 1220. Each of the support parts 1212 has the fixing pin 1213 for fixing the real wood sheet 100.

The press apparatus may further include a plurality of third slides 1215 fixed to maintain the shape of the engraved part 1211 of the lower press 1210 during the compression process of the real wood sheet. After the compression process of the real wood sheet, the third slides 1215 compress the rear surface of the real wood sheet 100 while rising along the embossed part 1221 of the upper press 1220, and then move laterally to remove a remaining portion of the real wood sheet.

Figure 26:
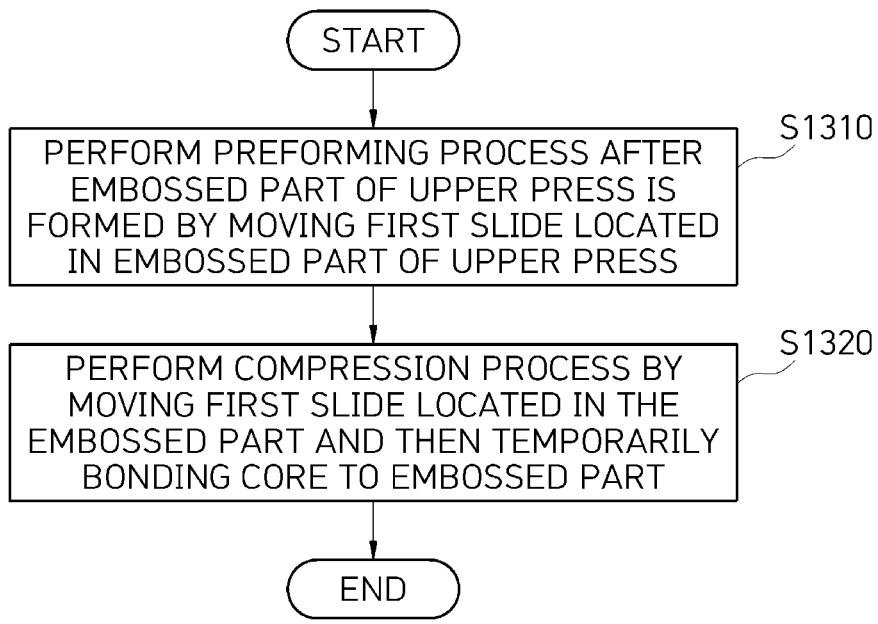
FIG. 26 is a flowchart for explaining a process of wrapping a real wood sheet using the press apparatus for vehicle crash pads comprising real wood sheets according to a fourth embodiment of the present disclosure.

Hereinafter, a method of pressing vehicle crash pads comprising real wood sheets according to a fourth embodiment of the present disclosure will be described with reference to FIG. 26.

First, a preforming process is performed after an embossed part 1221 of an upper press 1220 is formed by moving first slides 1222 located in the embossed part 1221 of the upper press 1220 so as to correspond to the width of the embossed part 1221 of the upper press 1220 (S1310).

Next, a compression process is performed by moving the first slides 1222 located in the embossed part 1221 such that a core 150 may be attached to the embossed part 1221 of the upper press 1220, and then temporarily bonding the core 150 to the embossed part 1221 (S1320).

Figure 27:
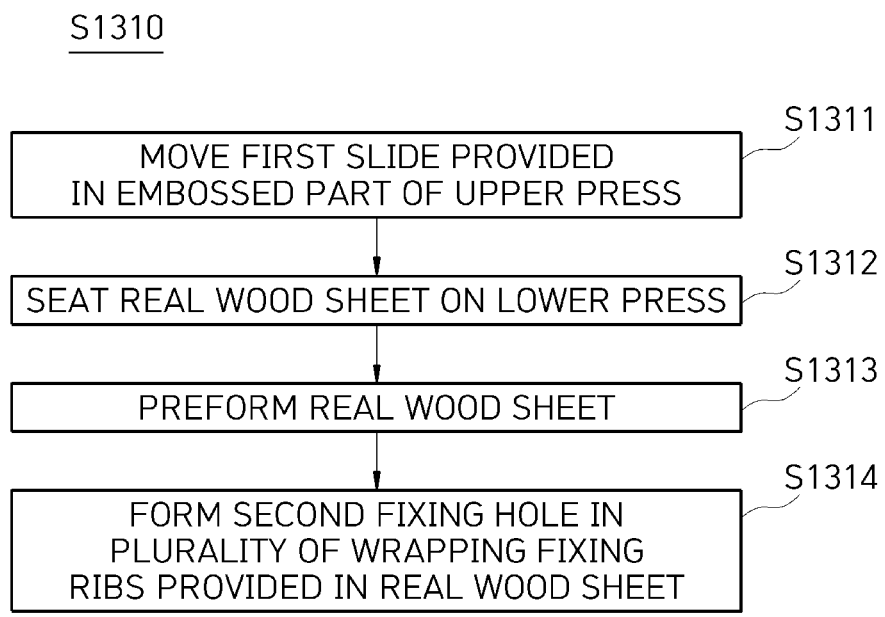
FIG. 27 is a flowchart for explaining a detailed process of the preforming step of FIG. 26.

Hereinafter, the step of performing the preforming process (S1310) will be described with reference to FIG. 27.

First, as illustrated in FIG. 16, the first slides 1222 provided in the embossed part 1221 of the upper press 1220 are moved so as to correspond to the width of an engraved part 1211 of the lower press 1210 (S1311).

Next, fixing pins 1213 provided on second slides 1212 of the lower press 1210 are inserted into first fixing holes formed in compression fixing ribs of a real wood sheet 100 to seat the real wood sheet 100 on the lower press 1210 (S1312).

Figure 17:
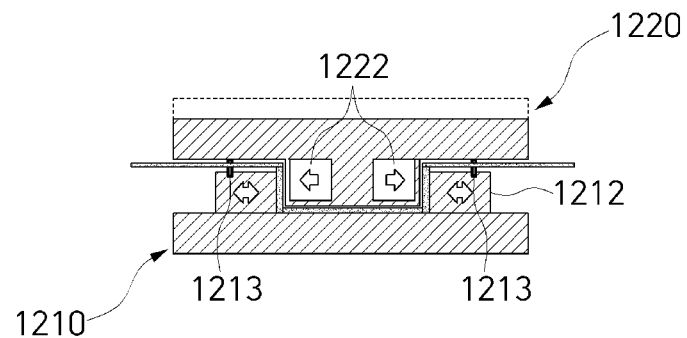

Next, as illustrated in FIG. 17, the real wood sheet 100 is preformed by compressing the upper press 1220 to the lower press 1210 (S1313).

Figure 18:
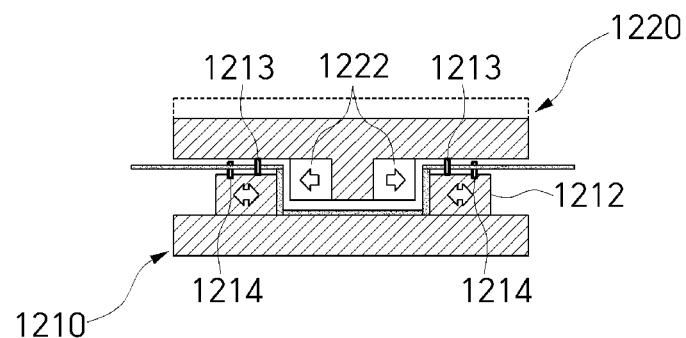

Next, after the real wood sheet 100 is preformed, as illustrated in FIG. 18, second fixing holes are formed in a plurality of wrapping fixing ribs provided in the real wood sheet 100 through processing pins provided in the second slides 1212 (S1314).

Figure 28:
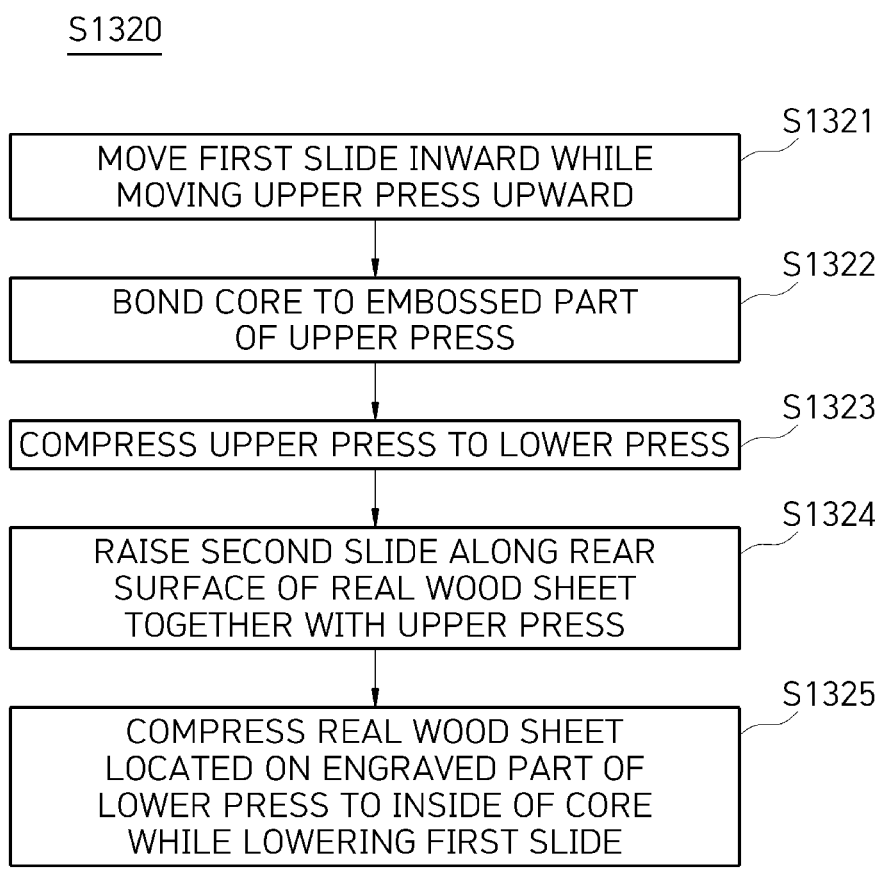
FIG. 28 is a flowchart for explaining a detailed process of the compression step of FIG. 26.

Hereinafter, a detailed process of the step of performing the compression process (S1320) according to the fourth embodiment of the present disclosure will be described with reference to FIG. 28.

Figure 19:
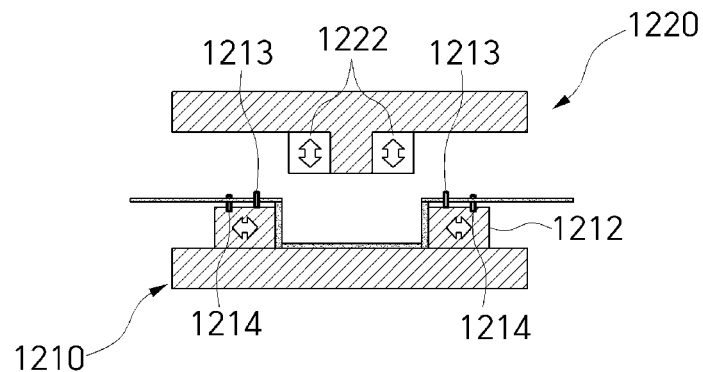

First, as illustrated in FIG. 19, after the preforming process is performed by compressing the real wood sheet 100 through the lower press 1210, the first slides 1222 are moved inward while the upper press 1220 is moved upward (S1321).

Figure 20:
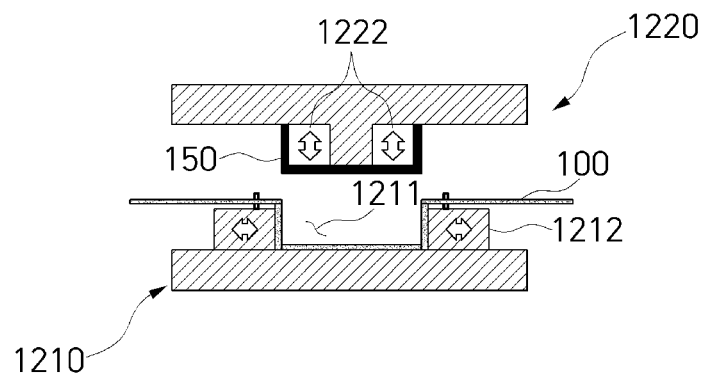

Next, as illustrated in FIG. 20, the core 150 is bonded to the embossed part 1221 of the upper press 1220 (S1322).

Figure 21:
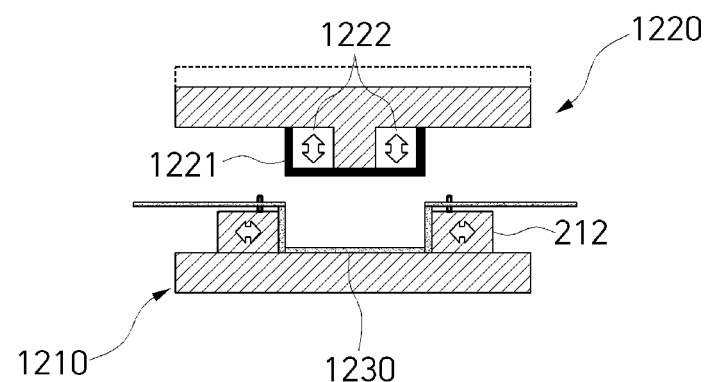
Figure 22:
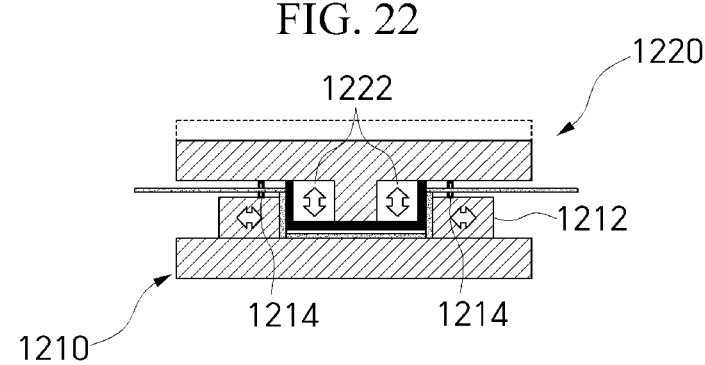

Next, as illustrated in FIG. 21, the upper press 1220 having the core 150 bonded thereto is moved down toward the lower press 1210 having the preformed real wood sheet 100 seated thereon, so that the lower press 1210 is compressed to the upper press 1220 as illustrated in FIG. 22 (S1323).

Figure 23:
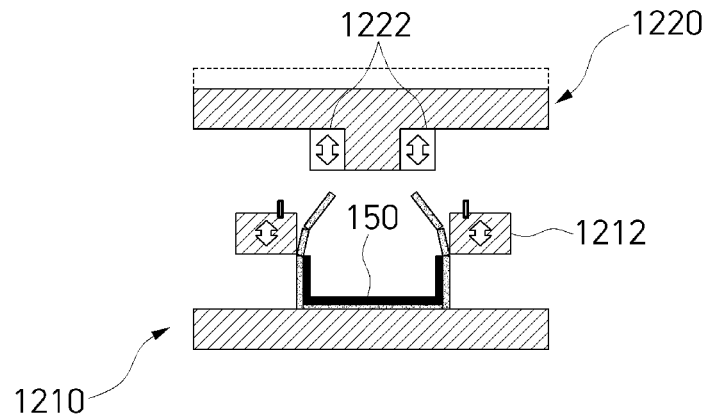

Next, as illustrated in FIG. 23, the second slides 1212 rise along the rear surface of the real wood sheet 100 together with the upper press 1220 (S1324).

Figure 24:
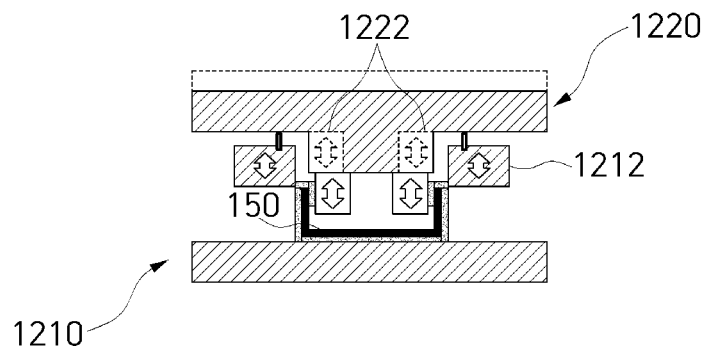

Next, as illustrated in FIG. 24, the real wood sheet 100 located on the engraved part 1211 of the lower press 1210 is compressed to the inside of the core 150 while lowering the first slides 1222 provided in the upper press 1220 (S1325).

Figure 25:
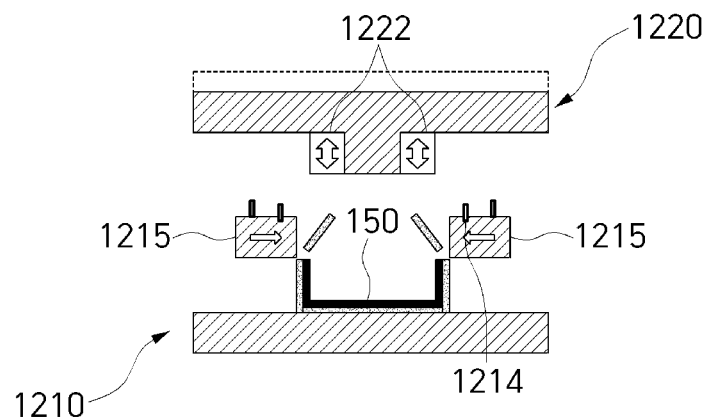
FIG. 25 is a view for explaining a process of cutting a real wood sheet in the press apparatus for vehicle crash pads comprising real wood sheets according to the third embodiment of the present disclosure.

During the compression process of the real wood sheet according to the fourth embodiment of the present disclosure, third slides may be fixed to maintain the shape of the engraved part 1211 of the lower press 1210. After the compression process of the real wood sheet, the third slides may compress the rear surface of the real wood sheet 100 while rising along the embossed part 1221 of the upper press 1220, and then move to the side of the real wood sheet 100 to cut a portion of the real wood sheet 100 deviating from the core 150, as illustrated in FIG. 25.

In the fourth embodiment of the present disclosure, an IMG skin may be applied.

First, the IMG skin on which a real stitch is sewn is fixed to the lower press 1210. In this case, it is preferable to fix the IMG skin to the lower press 1210 through a seating pin.

Next, the core 150 to which one of oil-based/water-based bonding/hot melt is pre-applied is fixed to the upper press 1220.

Next, the upper and lower presses 1210 and 1220 are compressed to each other, and a slide core is moved horizontally to compress/bond the side portions (including undercuts) of the IMG skin.

Next, the slide core is raised with the upper and lower press 1210 and 1220 open or closed, and then moved laterally, to automatically wrap a flange.

If there is an area that does not need wrapping, the slide core rises and then cuts that area. Accordingly, it is possible to automatically trim the real wood sheet.

Next, the product is removed after the upper and lower presses 1210 and 1220 are opened.

Figure 29:
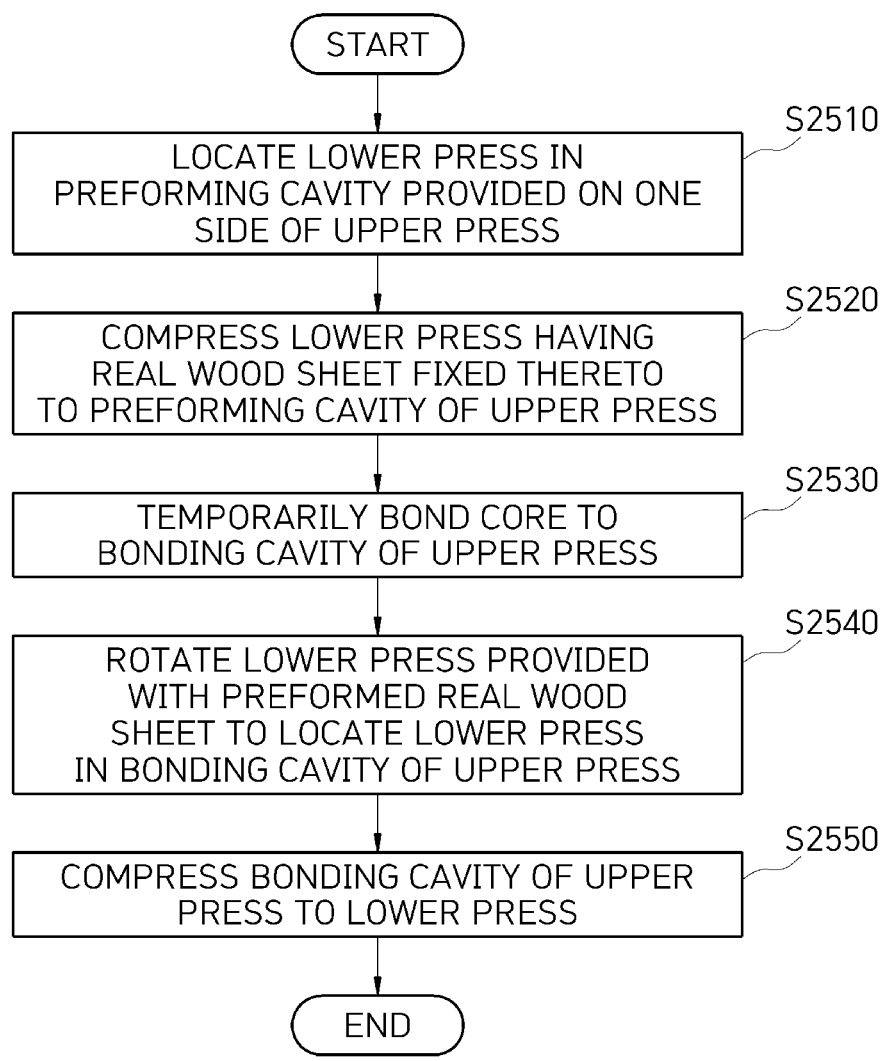
FIG. 29 is a flowchart for explaining a method of pressing vehicle crash pads comprising real wood sheets according to the fourth embodiment of the present disclosure.

Hereinafter, a method of pressing vehicle crash pads comprising real wood sheets according to the fourth embodiment of the present disclosure will be described with reference to FIG. 29.

First, a lower press is located in a preforming cavity provided on one side of an upper press having a bonding cavity on the other side thereof (S2510).

After a real wood sheet is fixed to the lower press, the preforming process of the real wood sheet is performed by compressing the lower press to the preforming cavity of the upper press (S2520). In the step of performing the preforming process of the real wood sheet (S2520), the lower press includes a skin holding pin, and the skin holding pin is fixedly inserted into a first fixing hole provided in each wrapping fixing rib of the real wood skin.

Figure 30:
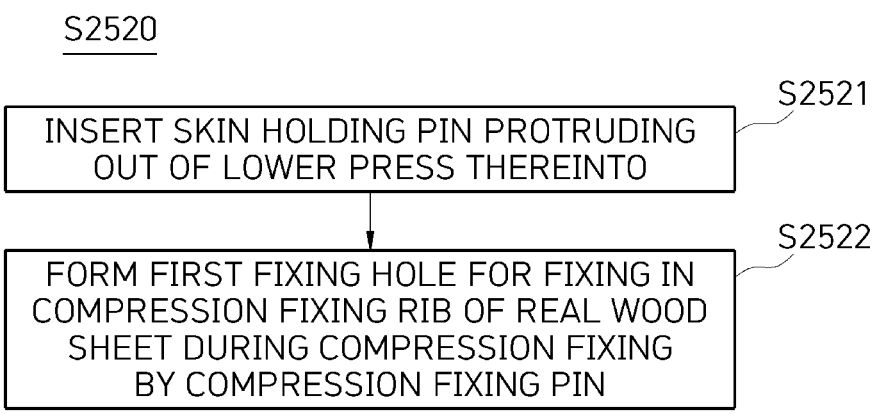
FIG. 30 is a flowchart for explaining a step of performing the preforming process of the real wood sheet in FIG. 29.

Hereinafter, the step of performing the preforming process of the real wood sheet (S2520) will be described with reference to FIG. 30.

First, the skin holding pin protruding out of the lower press is inserted thereinto (S2521).

Next, the first fixing hole for fixing is formed in each compression fixing rib of the real wood sheet during compression fixing by allowing a compression fixing pin provided inside the lower press to protrude therefrom (S2522).

In the step of performing the preforming process of the real wood sheet (S2520), during the preforming process, the skin holing pin provided in the lower press is pressed by a holding pin protrusion for inserting the skin holding pin protruding out of the lower press thereinto.

A core is temporarily bonded to the bonding cavity of the upper press (S2530).

A lower press mover allows the lower press provided with the preformed real wood sheet to rotate to locate the lower press in the bonding cavity of the upper press (S2540).

The bonding cavity of the upper press is compressed to the lower press (S2550). In the step of locating the lower press in the bonding cavity of the upper press (S2550), the lower press may slide from the preforming cavity to the bonding cavity.

As is apparent from the above description, according to the fourth embodiment of the present disclosure, it is possible to make the real wood sheet, constituting the vehicle desk, visually feel the same as real wood, and to provide a certain degree of cushioning when the real wood sheet is touched by an occupant.

According to another embodiment of the present disclosure, by rotating and moving the lower press and the core to the position of the bonding cavity of the upper press, it is possible to shorten the process time of bonding the preformed wood and the core.

According to another embodiment of the present disclosure, reducing the process time and the process steps can result in quality improvements and reduce investment/cost and cycle time.

Although the present disclosure has been described in detail with respect to the embodiments illustrated in the accompanying drawings, such embodiments are provided by way of example only. It will be understood by those skilled in the art that various modifications and variations may be made without departing from the spirit and scope of the disclosure as defined in the following claims. Therefore, the scope of protection of the present disclosure should not be limited to the above-mentioned embodiments and should be defined by the disclosure as defined in the appended claims.

What is claimed is:

1. A press apparatus for vehicle crash pads comprising real wood sheets, the press apparatus comprising:
    an upper press having a preforming cavity on one side thereof and a bonding cavity on another side thereof;
    a lower press configured to perform a preforming process through compression to the preforming cavity, and to perform compression to the bonding cavity by rotating during a compression process; and
    a lower press mover configured to rotate the lower press.

2. The press apparatus according to claim 1, wherein the lower press comprises a skin holding pin for fixing a real wood skin, the skin holding pin being inserted into a first fixing hole disposed in a wrapping fixing rib of the real wood skin.

3. The press apparatus according to claim 2, wherein:
    the skin holding pin protrudes out of the lower press or is inserted into the lower press; and
    the lower press comprises a compression fixing pin, the compression fixing pin protruding when the skin holding pin is inserted into the lower press, to form the first fixing hole for fixing in a compression fixing rib of a real wood sheet during compression fixing.

4. The press apparatus according to claim 2, wherein the preforming cavity of the upper press includes a holding pin protrusion for pressing the skin holding pin during the preforming process.

5. The press apparatus according to claim 1, wherein the lower press mover is configured to slide the lower press from the preforming cavity to the bonding cavity.

6. A method of pressing vehicle crash pads comprising real wood sheets, the method comprising:
    locating a lower press in a preforming cavity disposed on one side of an upper press having a bonding cavity on another side thereof;
    seating a real wood sheet on the lower press, and performing a preforming process of the real wood sheet by compressing the lower press to the preforming cavity of the upper press;

temporarily bonding a core to the bonding cavity of the upper press;

allowing a lower press mover to rotate the lower press provided with the real wood sheet to locate the lower press in the bonding cavity of the upper press; and compressing the bonding cavity of the upper press to the lower press.

7. The method according to claim 6, wherein, in seating the real wood sheet on the lower press, the lower press includes a skin holding pin, and the skin holding pin is fixedly inserted into a first fixing hole disposed in a wrapping fixing rib of a real wood skin.

8. The method according to claim 7, wherein the performing the preforming process of the real wood sheet comprises:

inserting the skin holding pin, which protrudes out of the lower press, into the real wood sheet; and forming the first fixing hole for fixing in a compression fixing rib of the real wood sheet during compression fixing by allowing a compression fixing pin disposed inside the lower press to protrude therefrom.

9. The method according to claim 7, wherein, in the performing the preforming process of the real wood sheet, during the preforming process, the skin holing pin is pressed by a holding pin protrusion for inserting the skin holding pin, which protrudes out of the lower press, into the real wood sheet.

10. The method according to claim 6, wherein, in the allowing the lower press mover to rotate the lower press provided with the real wood sheet to locate the lower press in the bonding cavity of the upper press, the lower press slides from the preforming cavity to the bonding cavity.

\* \* \* \* \*